United States Patent [19]

Portejoie et al.

[11] 4,355,387
[45] Oct. 19, 1982

[54] RESYNCHRONIZING CIRCUIT FOR TIME DIVISION MULTIPLEX SYSTEM

[76] Inventors: Jean-François Portejoie, 46, rue de Lorraine; Gilbert Noel, Kergarant Brevelenez; Jean-Claude Billy, 33, Résidence Duroux, all of 22300 Lannion, France

[21] Appl. No.: 121,420

[22] Filed: Feb. 14, 1980

[30] Foreign Application Priority Data

Feb. 21, 1979 [FR] France .................. 79 05109

[51] Int. Cl.³ .............................................. H04J 3/07
[52] U.S. Cl. ................................................... 370/102
[58] Field of Search .......................... 370/102, 91, 92

[56] References Cited
U.S. PATENT DOCUMENTS

```
3,830,980  8/1974  Peron et al. .................. 370/102
4,095,053  6/1978  Duttweiler et al. ........... 370/102
4,132,862  1/1979  Ferret et al. ................. 370/102
4,224,473  9/1980  Kaul et al. ................... 370/102
```

Primary Examiner—Douglas W. Olms
Attorney, Agent, or Firm—Laff, Whitesel, Conte & Saret

[57] ABSTRACT

The invention relates to input and output circuits for multiplexing equipment, especially the kind used in telephone systems where nominally identical clocking signals have natural deviations of timing (called "plesiochronous" signals). The invention uses the "justification" principle to ensure the clock synchronization of plesiochronous digital signals. A buffer memory, with independent writing and reading capabilities, is formed of two first in-first out or "FiFo" memories connected in series. The request signal for a "justification" is made when a connection is completed between an IR (Input-Ready) output of the second FiFo memory and an input SO (Shift-Out) of the first FiFo memory, if there is an undesirable phase shift between the input and output clocking system. A reading clock oscillator has a frequency which is governed by a governing signal, which depends, at least in part, upon the electrical state existing in the series connection between the IR output of the second FiFo memory and the input SO of the first FiFo memory. The receiving and demultiplexing system uses a similar buffer memory to extract any "justification" signals which were added on transmission. A phase-locked loop including a quartz-controlled oscillator controls the output clocking of the demultiplexer.

9 Claims, 6 Drawing Figures

INVENTIVE SYNCHRONIZATION CIRCUIT FOR ONE INPUT CHANNEL

FIG.5

INVENTIVE SYNCHRONIZATION CIRCUIT FOR ONE INPUT CHANNEL

RESYNCHRONIZING CIRCUIT FOR TIME DIVISION MULTIPLEX SYSTEM

The present invention relates to synchronization circuits for plesiochronous digital signals, through a use of the "justification" principle.

"Plesiochronous" digital signals occur when a plurality of cyclically repetitious signals from different sources are supposed to recur with the same clock timing. However, since circuits are not perfect, none of the signals from the different sources will necessarily have exactly the same timing as the signals from the other sources. Thus, there may be phase differences between the clocking from the various sources, although all of the signals will tend to cluster around some center point on a time scale.

The problem of synchronizing plesiochronous digital signals is encountered when there is a multiplexing of digital signals. Consider the simple case of multiplexing N synchronous digital signals having the same nominal rate of delivery. If the elementary period of these signals is called "T," the first time-multiplexing operation is to assign to each binary element of each signal a time interval $t = T/N$. Second, the binary elements are interleaved in a manner which provides a multiplexed frame signal in which the first binary element or bit comes from a signal source No. 1, the second bit from a signal source No. 2, ... the Nth bit from a signal source No. N, the $(N+1)^{th}$ bit from the signal source No. 1, the $(N+2)^{th}$ from the signal source No. 2, etc.

In practice, a real network multiplexes digital signals produced from independent oscillators. They have a delivery rate within a definite range which is centered around the common or nominal rate of delivery. Therefore, they are plesiochronous. Before multiplexing them, it is necessary to bring them into synchronism with a central clock signal, which is achieved by carrying out a "justification" process.

"Justification" is described as being positive and is standardized by the CCITT, which is an international standard that is used in a large number of countries, one of which is France. That is why the following circuit description is given relative to positive "justification" multiplexing. However, it must be understood that, according to the invention, the circuit may also be used in a multiplexing system with negative "justification" or with combined positive-negative "justification." It must also be understood that, according to the invention, the circuit may be used in the demultiplexing systems.

Independent of the fact that the digital signals to be multiplexed are plesiochronous, it is also necessary to know that the multiplexed digital signals are divided into segments of equal length, called scans or frames. In addition to the informational binary elements coming from the signals to be multiplexed, each scan or frame comprises a reference signal called a "locking work," formed by a given number of binary elements. This locking word or "MVT" is recognized in and used by the demultiplexing unit, to recover the interleaving order of the information binary elements. The insertion of the MVT into each scan or frame requires a certain time period during which informational binary elements cannot be entered.

Therefore, even if the signals to be multiplexed might begin as synchronous signals, the multiplexing with scans or frames causes the insertion rhythm of the information binary elements to lose synchronization with respect to the rate or rhythm of the arrival of those binary elements. It will be seen, below, that the binary elements of the locking word are not the only bit elements to be inserted into a scan or frame, in addition to the informational binary elements. There are also the "justification" indicating binary elements, and the "justification" binary elements themselves.

An object of the present invention is to provide input circuits for multiplexing equipment which make it possible to use a high-capacity buffer-memory for time justification. Another object of the invention is to ensure the generation of a "justification" request signal.

Still another object of the invention relates to the structure of the system formed by a buffer memory and a phase-comparing device, which are extremely simplified, in order to provide timing.

Yet another object of the invention is to provide, in the output circuits of demultiplexing equipment, a buffer memory with independent reading and writing capabilities and with a phase comparison circuit which drives an oscillator of a reading clock, and with circuits which eliminate "justification" bits. Here, an object is to provide the structure of a complex "justification" system formed by a buffer memory and a phase-comparing unit.

Finally, an object of the present invention is to provide systems not only for positive "justification," but also for negative "justification," or for both positive and negative "justification."

According to a characteristic of the present invention, input circuits of multiplexing equipment comprise circuits to bring about the "justification." A buffer memory has independent writing and reading capabilities. The buffer memory is formed by a pair of first in, first out (FiFo) memories which are connected in series. The connection between the IR output (Input-Ready) of the second FiFo memory and the SO input (Shift-Out) of the first memory bring about a signal for the "justification" request.

According to another characteristic of the invention, the demultiplexing equipment includes circuits to eliminate the "justification" signal. A buffer memory in the demultiplexer, has connected independent writing and reading capabilities and is formed of two FiFo memories placed in series. The connection between the IR output of the second FiFo memory and the SO input of the first FiFo memory drives the reading clock oscillator.

In keeping with an aspect of the invention, these and other objects are accomplished at the input circuits for multiplexing equipment, especially the kind used in telephone systems where channel signals nominally have identical clocking but, in reality, have natural deviations of timing, called "plesiochronous signals." To ensure the synchronization of plesiochronous numerical signals, the invention uses the "justification" principle. Upon receiving a "justification" request signal, a buffer memory formed of two first in, first out or "FiFo" memories connected in series, uses independent writing and reading capabilities to slightly delay signals and thereby bring them into a time coincidence. The request for a "justification" is made when the phase difference between the writing and reading exceeds a threshold level.

A preferred embodiment of the invention is seen in the attached drawings, in which.

Next to be described (FIGS. 1 to 3) is the structure and the operation of a known synchronization circuit for an input signal channel, of a type which is presently used in a numerical signal multiplexing unit.

Figure 1:
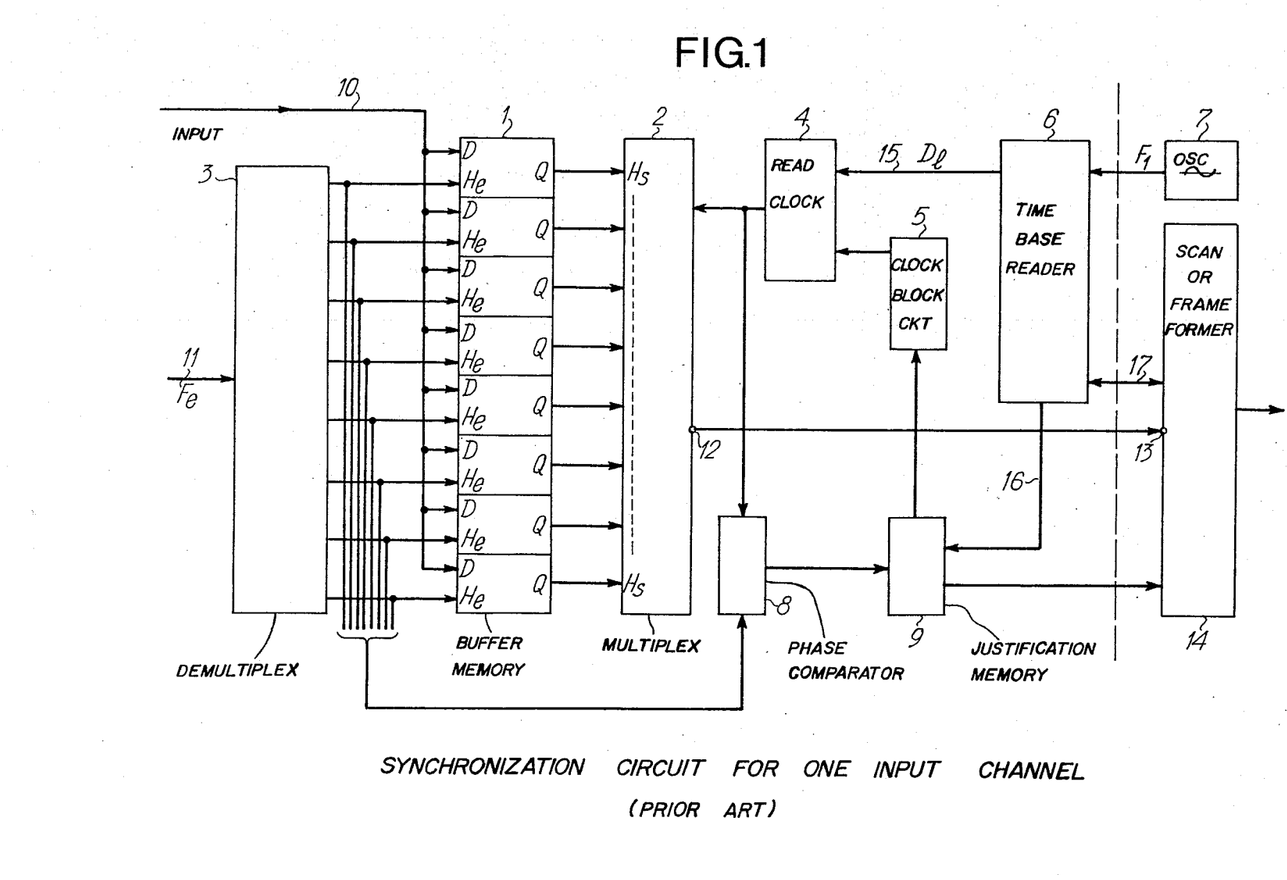
FIG. 1 is a block diagram of a prior art synchronization unit for an input signal channel.

The synchronization unit in FIG. 1 comprises a buffer memory 1, here having an exemplary eight cells, a multiplexing circuit 2, a writing clock demultiplexing circuit 3, a reading clock 4, a reading clock blocking circuit 5, a reading time base circuit 6, an oscillator 7, a phase-comparing unit 8, and a memory 9 for storing "justification" request signals. Each cell of buffer memory 1 may store one binary element or bit. The input path 10 of a signal to be multiplexed is connected in parallel with the signal inputs D of the buffer memory cells. In practice, the demultiplexing circuit 3 is a decoding counter which receives, at its input 11, writing clock signals having a frequency Fe, and eight outputs which are respectively connected to the inputs He of the individual memory cells. The eight outputs of demultiplexer 3 are cyclically activated at the clock rhythm or frequency Fe. The outputs Q of the cells of buffer memory 1 are, respectively, connected to individually associated inputs Hs of the multiplexing circuit 2. The inputs of circuit 2 are cyclically activated at the rhythm or clock frequency Fl, responsive to signals delivered to it by clock 4. The output 12 of the multiplexer circuit 2 delivers the synchronized data to input 13 of a scan or frame formation circuit 14. These are the binary elements transmitted to the activated inputs of multiplexer 2. The output 12 is read by circuit 14, under the guidance of time base reader circuit, and assembled into a scan or frame format.

The phase-comparing unit 8 has one input connected to the output of clock 4, and one input connected, in parallel, with the outputs of demultiplexer 3. The output of phase-comparing unit 8 is connected to the signal input of "justification" request memory 9. The signal output of memory 9 is connected to an input of the scan or frame formation circuit 14, and its governing output is connected to blocking circuit 5. Time base reader 6 has an output 15 connected to clock 4, and an output 16 connected to the reading input of "justification" memory 9. Time base reader 6 has an input which is connected to the output of oscillator 7 and a two-way terminal connected to a terminal 17 of the scan or frame former 14.

Figure 2:
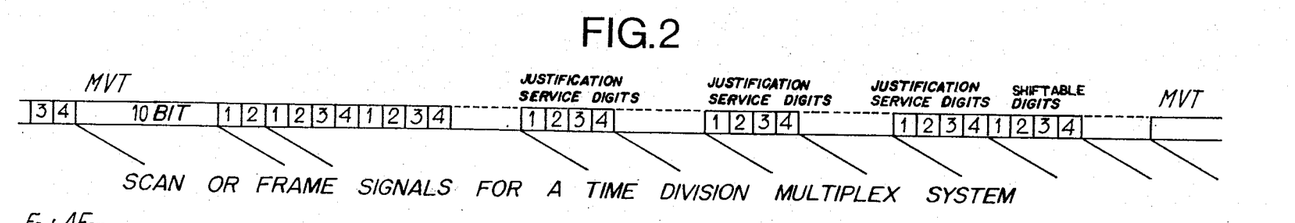
FIG. 2 is a diagram which shows the structure of an exemplary scan or frame of a time division multiplexed signal.

FIG. 2 shows the signals of a scan or frame of the multiplexed signal delivered by the scan or frame former circuit 14. Circuit 14 is connected to as many synchronization units (each identical with FIG. 1) as there are signal channels to be multiplexed. In the scan example in FIG. 2, it is assumed that four numerical signals, numbered 1 to 4, have been multiplexed responsive to signals from four channels.

The scan or frame begins with a scan-locking word MVT comprising ten bits, followed by two reserve bits. Afterward, there are several first bit series marked "1, 2, 3 and 4," which indicates the four channel signals carrying the information to be multiplexed. Afterward, the scan has a series of four bits corresponding to indications of "justification" which are determined by circuit 14. Then, there are several second series of four bits carrying further information coming from the channels. Then, there is a new series of four bits corresponding to the "justification" indications coming from scan or frame forming circuit 14. Then, there are several third series of four bits, carrying information bits from the channels. Afterward, there is a new series of four bits of "justification" indications which is immediately followed by a series of four bits which respectively carry information coming from the channels, or "justification" bits coming from multiplex circuit 2. Finally, the scan ends with series of four bits carrying information coming from the channels. Thereafter, a new scan follows.

Hereafter, the designation "Fs" identifies the nominal frequency or rhythm of the scan. The frequency Fs is delivered by oscillator 7 and is common to the synchronization of four units. The letter "N" indicates the number of component signals (here N is equal to four (4)). The letter "P" indicates the number of systematic bits in the scan. The letter "Q" indicates the total number of information bits in the scan. The systematic bits are the bits of the lock word MVT, the reserve bits and the "justification" indication bits.

Using the foregoing notation, the rate of delivery Dl offered for each component signal is:

$$\frac{Fs}{P+Q} = \frac{N \cdot Dl}{Q}$$

AND:

$$Dl = \frac{Fs}{N\left(1 + \frac{P}{Q}\right)}$$

In the case of a positive "justification," the delivery rate Dl is chosen to be greater than the frequency Fe, of each component signal. It is necessary to add, to the information bits of the component signal, the binary elements called "justification" bits, in order to obtain the delivery rate of frequency Dl. The "justification" bits have no meaning insofar as the transmitted ingtelligence is concerned. Their frequency is:

$$Fd = Dl - Fe$$

Figure 3:
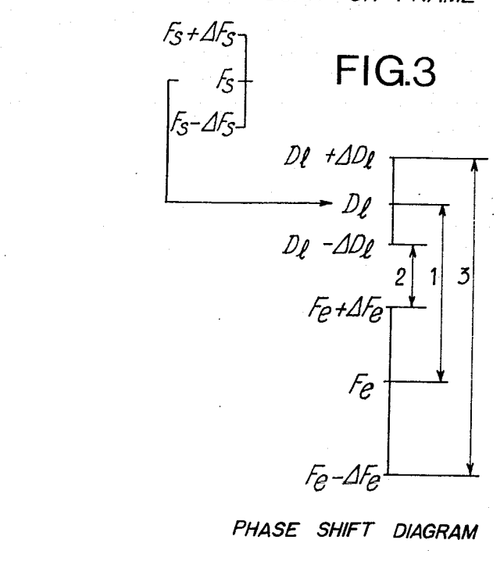
FIG. 3 is a diagram illustrating the operation of the synchronization units shown in FIGS. 1 and 5 when the phase of input and output signals are different.

As in all transmission systems, the reading and writing clock pulses present minor frequency variations. As shown in the diagram of FIG. 3, the real frequency Fd may vary between a maximum value (Dl+ΔDl)−(Fe−ΔFe). A minimum value (Dl−ΔDl)−(Fe+ΔFe) Dl is chosen so that the quantity is always positive, and ΔDl and ΔFe represent acceptable variations.

Since the "justification" bits have no meaning, they must be eliminated during the demultiplexing in the receiver, which receives the scan signals shown in FIG. 2. Therefore, it is necessary to verify both their existence and their location. To that end, the circuit obeys the following rules. Per component signal, only one "justification" bit can be inserted per scan. If inserted, it can be positioned at only a well-determined elementary point in time, the format of FIG. 2. In fact, for a given component signal, the "justification" per scan is not symmetrical. It depends on the real difference between the delivery rate Dl and the frequency Fe.

Therefore, the location reserved for the "justification" bit contains either the "justification" bit or an information bit. Moreover, the existence or non-existence of a given component signal in a scan is indicated by the values of the corresponding binary elements of the "justification" indication. The "justification" bit assumes the value "1" when there is "justification," and the value "0" when there is no "justification." The scan or frame in FIG. 2 has three "justification" indication bits per component signal, as a protection against possible errors, using a majority detection criterion at the receiver. It is also possible to provide for five "justification" bits, for a still better protection. The locations reserved in the scan or frame for the "justification" indicating bits define among themselves sectors which preferably are approximately equal.

Time base reader 6 (FIG. 1) is constituted by a succession of logical dividers which make it possible to create all of the time intervals necessary for the formation of the scan in FIG. 2. The rhythm or frequency Fs received by reader 6 is divided by N (=4) and impulses are eliminated at the locations provided for the systematic bits. Therefore, time base reader 6 delivers the clock signal "with holes" in the rhythm, which is the delivery rate Dl.

The signal information bits transmitted over input wire 10 are written into the cells of buffer-memory 1, at their own rhythm Fe. Those information bits are read by clock 4 and by multiplex circuit 2 at the delivery rate rhythm Dl of the clock "with holes." Since rate Dl is always greater than frequency Fe, the reading has a tendency to catch up with the writing. The "justification" comes into play to prevent that catching up. Indeed, bit by bit, the phase-comparing device 8 permanently measures the phase shift between the clock signals emitted by the demultiplexer 3 and by the read clock 4. When that shift or difference exceeds a set threshold or minimum difference (called the "lug point"), the phrase-comparing device 8 transmits to justification memory 9 a request for a "justification signal." The memory 9 registers this request signal and transmits it to the scan or frame formation circuit 14.

The scan formation circuit 14 register the "justification" signal as it is received from memory circuit 9. During the individual scan period, when the "justification" request is stored in the scan or frame former 14, nothing occurs. However, on the next scan, the binary elements of the "justification" indication are applied to buffer memory 1 in the component signal channel having the synchronization unit which originated the request for "justification" signal. Circuit 14 transmits the order for having a "justification" performed through connection 17 to time reader base 6. The circuits of the time base reader 6 transmit through output 16, to "justification" memory 9, a reading order which is forwarded toward clock blocking circuit 5.

At the elementary point in time when "justification" is possible for the channel under consideration, clock 4 does not transmit any forward motion signal to multiplexing circuit 2. It will be recalled that the elementary points in time for "justification" are placed, in the scan in FIG. 2, immediately behind the third series of the binary elements of the "justification" indications.

Thus, at the elementary point in time, "justification" is ordered as just described.

Output 12 of multiplex circuit 2 presents the same binary element that it was presenting at the time of the preceding reading, because its activated input has not changed since the preceding point in time because the clock pulse was blocked by circuit 5. Therefore, at the next point in the time of reading order, output 12 signal is released toward scan or frame former 14. The bit of the preceding elementary point in time is then detected.

Figure 4:
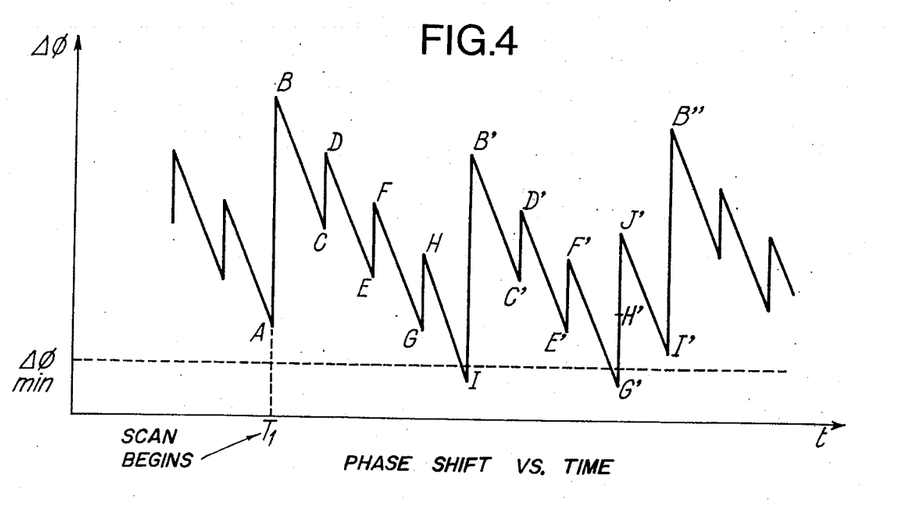
FIG. 4 is a diagram of a signal phase shift which illustrates the operation of the synchronization units in FIGS. 1 and 5.

The diagram in FIG. 4 illustrates variations in the phase difference $\Delta\phi$ between the clock signals at the inputs of phase-comparing device 8, as a function of time. It will be recalled that the difference measures the delay or time lag of the readings started by clock 4, working at the mean delivery rate or rhythm Dl, relative to the writings started on terminal 11 with the rhythm Fe.

After time T1, which marks the beginning of a scan, the phase difference between the input signal and the clock pulses increases rapidly from A to B, because during the scan-locking word MVT, plus the two reserve bits, clock 4 does not command a readout, while writing goes on. Between B and C (FIG. 4), during the first information sector, the phase difference decreases because the delivery rate Dl is greater than the frequency Fe. Between C and D, during the first series of "justification" indicating bits, the shift or difference again increases. Between D and E, during the second information sector, it decreases. Considering the fact that the information sector is appreciably longer than the series of the "justification" indicating bits, point E is appreciably below point C. Between E and F, the phase difference increases as between C and D; then it decreases between F and G, during a third sector of informations, prior to increasing again from G to H during the third series of the "justification" indication bits.

During the fourth sector H to I of information, the difference decreases. In the case under consideration, it is assumed that the difference in phase shift goes down in I, which is below a threshold limit "$\Delta\phi$ min," which corresponds to the lug point where "justification" is requested, as mentioned above. As soon as the difference goes below that threshold limit, the phase-comparing device 8 transmits the "justification" request signal to memory 9, as described above.

In practice, considering the fact that the most important increase in the phase difference occurs at the beginning of each scan, as here shown between A and B, the passage below the threshold limit always occurs near the end of a scan as indicated at I. From the beginning of the next scan, at time T2, the difference increases from I to B', then it follows a see-saw pattern of variation, similar to the preceding one, which runs through C', D', E', F' and G'. However, in that scan, the difference may have fallen below the threshold or lug point at time G'. What must be noted is that, after having normally increased during the "justification" indication bit, between G' and H', it still increases between H' and J during the "justification" bit because the clocking circuit 5 has worked. At the end of the scan, in time I', the phase difference is above the lug point.

The process then starts again, but the phase difference at time B" may be above G. Since the jitter conditions have changed, the next request for "justification"

does not necessarily occur in the scan beginning with I'. During the multiplexing, when it is observed in the receiver that in one scan the "justification" indication bits are at "1," it is known that the bit which follows the last "justification" indication bit has no meaning, and it is not transmitted.

For different reasons, such as for example, jitter stresses, it is necessary, in practice, to increase the capacity of buffer-memory 1 which, in the example described, contains only eight cells. The increase in the number of cells of that type also causes an increase of the capacity of both the multiplexing circuits 2 and demultiplexing circuits 3. This increase makes these circuits more complex, just as it makes the input circuits of phase-comparing device 8 more complex.

It must be noted that, in order to improve the performances in the residual jitter of a multiplexing equipment, the phase-comparing device must perform the comparison on a binary element by binary element basis. This explains the increased complexity of its input circuits as soon as the capacity of buffer memory 1 increases.

From the description of FIG. 1, which has just been given, it may be seen that, in the input circuits of a multiplexing equipment, it is possible to distinguish, on one side, the buffer memory with independent reading and writing, and on the other side, the circuit for comparing the reading and writing operations. The invention delivers a signal when the difference between the writing and reading clock signals passes a threshold. Finally, between themselves, the circuits comprising buffer memory 1, clock blocking circuit 5, read clock 4, time base reader 6 and the scan or frame formation circuit 14 work out the "justification." That is to say, they set the "justification" indication bits and the clock 4 at a predetermined elementary point of time in the scan, which follows the generation, by the phase-comparing device, of a "justification" request signal.

Figure 5:
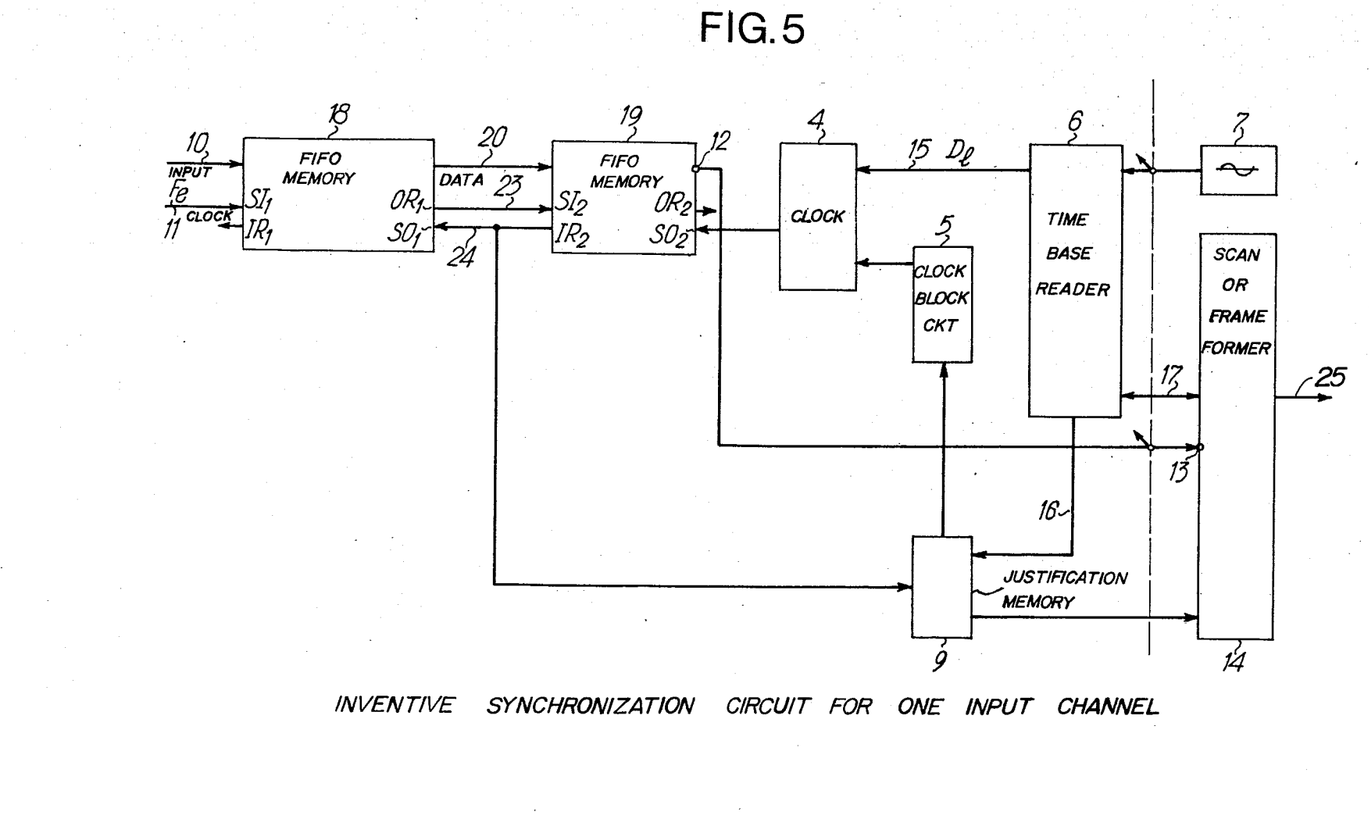
FIG. 5 is a block diagram of a synchronization unit for the input signal channel, according to the invention.

In the inventive synchronization unit in FIG. 5, the input path 10 for the signal to be multiplexed is connected to the data input terminal of an FiFo memory 18. The input clock terminal $SI_1$ is connected over wire 11 to a writing clock which provides cyclically recurring clock pulses having a frequency Fe. The data output of FiFo memory 18 is connected to the data input of a second FiFo memory 19, via a connection 20. The data output terminal 12 of FiFo memory 19 is connected to the input 13 of the scan or frame formation circuit 14.

It will be recalled that an FiFo memory is a memory formed of registers connected in such a manner that the output of one feeds the input of the next. However, unlike shift-type registers, they do not have a common clock for controlling the read and write cycle. The FiFo memories are well-known and, for the sake of an example, may be an FiFo memory sold under Reference No. Am 3341/2841, by the U.S. firm "Advanced Micro Devices." A description of such a memory is given in the French Journal "EMI" under the title "The FiFo Memory: conception and application" by P. Pinson, in Journal Number 185/3/15/74, pp. 45 to 49.

Each register of the FiFo memory has an associated and controlling flip-flop rocker (not shown). When information is written into a register, its flip-flop rocker sets at "1." If the flip-flop rocker of the following register is also at "1," nothing occurs. However, if the next register flip-flop is at "0," immediately upon reception of the reading clock signal, the information is copied into that register, and the rocker of the preceding registers passes to "0."

The governing terminals of an FiFo memory are an SI input terminal (Shift-In) which receives the writing clock signals, an output terminal IR (Input-Ready), the state "1" or "0" which indicates whether information on terminal 10 may or may not be written into the first register of the memory, at the time of its reception, responsive to a clock signal at terminal SI. An OR output terminal (Output-Ready) may be at the state "0" or "1" which indicates whether information is or is not present in the last register of the memory. A SO input terminal (Shift-Out) receives the reading clock signals. The output states of terminal IR or OR are respectively deduced from the states of the first and the last flip-flop rockers.

In the input channel synchronization unit in FIG. 5, the FiFo memory 18 has corresponding inputs and outputs $SI_1$, $SO_1$, $IP_1$ and $OR_1$. The FiFo memory 19 has the corresponding inputs and outputs $SI_2$, $SO_2$, $IR_2$ and $OR_2$. Input $SI_1$ is connected to the clock via wire 11. Output $OR_1$ is connected to input $SI_2$ via wire 23. Output $IR_2$ is connected to input $SO_1$ via wire 24.

The synchronization unit in FIG. 5 comprises clock 4, time base circuit 6, clock blocking circuit 5, "justification" memory 9, oscillator 7 and the scan or frame formation circuit 14. These circuits may be identical with those circuits bearing the same reference numbers in the synchronization unit in FIG. 1. They are connected in the same manner. The structure of the scan or frame formation circuit may be conventional, of the type of those circuits which are used in existence in numerical multiplexing equipments, such as the TNM2-4 system.

Input $SO_2$ of FiFo memory 19 is connected to the output of clock 4, and connection 24 is connected in parallel to the data input of "justification" memory 9.

The capacity of second FiFo memory 19 may be of the same order as that of first FiFo memory 18. As an example, their common capacity may be eight bits, but it may also be much higher, even as high as 64 bits, for important jitters.

FIG. 5 operates this way. Consider the states of the two FiFo memories 18 and 19 at the precise time corresponding to point B (FIG. 4). Memory 19 is full and memory 18 is almost full. Between B and C (FIG. 4), since the clock 4 connected to the second FiFo memory 19 output $SO_2$ is more rapid than the one connected to the first FiFo memory 18 input 11, memory 18 has a tendency to empty itself toward memory 19. Between C and D, the reading is interrupted at the terminal $SO_2$, and the first FiFo memory 18 tends to fill up, and so forth... until the lug point I (FIG. 4) is reached. At that point in time, the first FiFo memory 18 is empty and the second FiFo memory 19 is no longer full. As a result, the connection 24 constantly remains in the state "1," because input $IR_2$ indicates that information may be written into second FiFo memory 19. In practice, it must be understood that each time the FiFo memory register 19 is empty, connection 24 passes to the state "1." However, this "1" state does not persist if the first FiFo memory 18 contains information because the last level of memory 18 empties itself into the first level of memory 19. Besides, when memory 18 is empty, information continues to enter it, coming from input 10. Those incoming informational signals pass very rapidly through memory 18, and the wire 24 leaves its state "1"

for only a short time, upon the passing of the information from memory 18 to memory 19.

As a conclusion, assuming that the input circuit of "justification" memory 9 presents some inertia, as soon as memory 18 is empty, memory 9 receives from output terminal 24 a signal "1," which corresponds to a request for "justification." Circuits 14, 6, 9, 5 and 4 operate in response to the request for "justification" signal in the same as that described with respect to FIG. 1. Especially in the following scan or frame, circuit 14 sends to buffer memory 1 the "justification" indication bits and, during the precise time of the "justification" bit, the signal transmitted to the scan former circuit 14, via its input 13, is read a second time.

From the preceding description, it is seen that the FiFo memories 18, 19 make it advantageous to replace the circuits 1, 2, 3 and 8 in FIG. 1 that are too complex. Besides, the capacity of the first FiFo memory 18 may be increased, which is easily done by connecting a number of FiFo memories in series, without restraint, to take into account the jitter restraints.

It must be noted that the output terminals $IR_1$ and $OR_2$ normally do not change state, because the first FiFo memory 18 is never completely full, and the second memory 19 is never completely empty, except in the case of circuit disorders.

Figure 6:
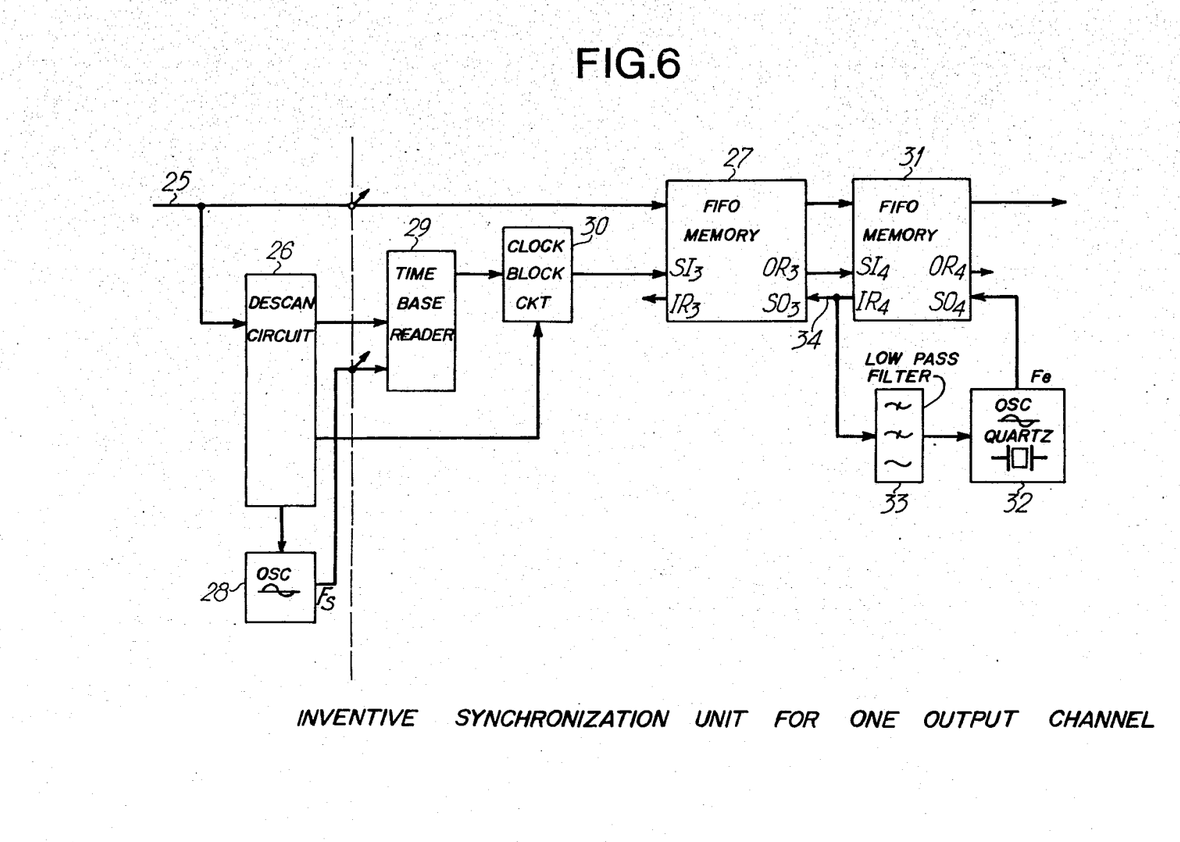
FIG. 6 is a block diagram of a synchronization unit for the output signal channel, according to the invention.

FIG. 6 represents a desynchronization unit of a demultiplexing device which receives the multiplexed signals, as represented in FIG. 2. The multiplexed signals are received on input 25 which is connected to the input of a descanning circuit 26 and also to the data input of a first FiFo memory 27. An output of circuit 26 serves as a guide for oscillator 28 which reconstitutes the Fs frequency of the trains of binary elements received at input 25. In addition, circuit 26 detects the locking words MVT of the successive scans or frames and delivers, to a time base reader 29, the service information which is necessary for the detecting of the systematic bits. Time base reader 29 receives the clock signals from oscillator 28.

Finally, circuit 26 comprises a counter which, for each component signal, adds the value of the "justification" indication bits to determine whether "justification" is or is not required in any given scan. Circuit 26 is connected to a clock blocking circuit 30 which blocks the output signal of time base reader 29, at the precise time of a "justification" bit. The output of base time reader 29 is connected, through blocking circuit 30, to input $SI_3$ of the first FiFo memory 27. Only the data corresponding to the output channel of the synchronization unit may enter into memory 27. The data output of the first FiFo memory 27 is connected to the data input of a second FiFo memory 31. The input $SI_4$ of memory 31 is connected to the output $OR_3$ or memory 27. The output $IR_4$ of memory 31 is connected to the input $SO_3$ of memory 27. Input $SO_4$ of memory 31 is connected to the output of a quartz voltage controlled oscillator 32. The governing input of oscillator is connected to the output of a low-pass filter 33, the input of which is connected to wire 34 which connects output $IR_4$ to input $SO_3$.

In the demultiplexing device and a desynchronization unit, the circuits 26, 28, 29, 30, 32 and 33 are conventional. Oscillator 32 delivers a signal at the frequency Fe of the demultiplexing channel. In practice, the buffer memory is formed by the FiFo memories 27, 31 connected in series, to regulate oscillator 32.

The operation of the circuit of FIG. 6 is as follows. At the input 25 of first FiFo memory 27, the bits of the channel signal enter at the rhythm of the clock "with holes," as delivered by time base reader 29, operating as the time base reader 6 operates. The capacity of the second FiFo memory 31 is chosen to be full and to overflow into memory 27 during the scan. Memory 31 has a tendency to empty itself during the scan locking words, as well as during the "justification" and the possible "justification" indications. The voltage level of the connection 34 passes to a "1" during the systematic passings of the binary elements, as well as during the passing of the possible "justification" signals. Those signals are passed by the low-pass filter 33 before being applied to the governing input of the crystal-controlled oscillator 32. In this manner, the circuits 33, 32 and 31 behave as a phase-locking loop.

With reference again to FIG. 5, it must be well understood that the whole system formed by circuits 6, 5, 4 and 9 constitutes what is possibly called a circuit for the treatment of a "justification" request.

Moreover, it will be seen that the same arrangement of two FiFo memories, placed in series, makes it possible, with an associated treatment circuit for negative "justification" or for positive-negative "justification." Simply by reversing the sign of the signal which starts the request for the negative justification and by keeping the same convention for the positive-negative "justification," it is easy to execute those types of "justification."

Those who are skilled in the art will readily perceive how to modify the system. Therefore, the appended claims are to be construed to cover all equivalent structures which fall within the true scope and spirit of the invention.

The invention claimed is:

1. A multiplexing input circuit for ensuring the synchronization of plesiochronous numerical signals responsive to a "justification" principle, said circuit comprising means for generating a "justification" request signal responsive to a detection of a need for retiming said plesiochronous signals, buffer memory means having independently writing and reading capabilities for receiving signals at one clocking rate, and retransmitting said signals at a different clocking rate, said buffer memory being formed of two FiFo memory means connected in series, and means selectively responsive to the electrical state on the series connection between the first and second FiFo memories for causing the generation of a request for "justification" signals.

2. The circuit of claim 1 wherein said system further includes means for assembling incoming signals into frames of outgoing signals and means for inserting said request for "justification" signals into said frame of outgoing signals, said request for "justification" having no meaning with respect to information in said incoming and outgoing signals.

3. The circuit of claim 2 and means responsive to said request for a justifying signal for delaying said outgoing signal until a particular time relationship occurs in said two clocking systems.

4. A circuit for retiming signals which are transmitted in binary form, said circuit comprising a pair of first in-first out memory means coupled in series, means for storing incoming signals in a first of said pair of memory means, means for transferring said stored signals from said first to the second of said pair of memory means, means for reading out and transmitting outgoing signals from said second memory means, whereby incoming signals may be stored at one timing relationship and read out at another timing relationship, means responsive to a timing signal relating said incoming signals and said outgoing signals for commanding a "justification" of said outgoing signals, means responsive to said "justification" command for delaying said readout until the phases of said incoming and outgoing signals tend to coincide in a predetermined manner, and means responsive to said delayed readout for assembling said data into a frame format for transmission.

5. The circuit of claim 4 wherein said frame format includes signals from a plurality of channels and there is one of said pair of memory means for each of said channels.

6. The circuit of claim 4 wherein said circuit has a threshold of acceptable phase difference between said incoming and outgoing signals, said phase being being free to shift as long as said difference does not cross said threshold level, and means for initiating the command of said "justification" signal responsive to said phase shift crossing said threshold.

7. The circuit of one of the claims 4, 5 or 6 and means for receiving the signals which are transmitted in said frame format, said receiving means comprising a second pair of first in-first out memory means coupled in series, means for storing said received signals in a first of said second pair of memory means, means for transferring said stored signals from said first to the second of said second pair of memory means, means for retransmitting said transferred signals from the second of said second pair of memory means, whereby said second pair of memory means may operate at different timing, means for extracting any "justification" signals appearing in said frame format, and phase-locked loop means including a quartz-controlled oscillator associated with the second of said second pair of memory means for locking said second memory means into a predetermined clocking system.

8. The circuit of claim 7 wherein said frame format received by said receiving means includes signals from a plurality of channels and there is one of said second pairs of memories for each of said channels.

9. A demultiplexing output circuit for ensuring the synchronization of plesiochronous numerical signals, responsive to a "justification" principle, said circuit comprising means for cancelling a "justification" in transmitted signals, buffer memory means comprising two FiFo memory means connected in series and having independent writing and reading capabilities, a reading clock oscillator means for generating clock pulses at a frequency governed by a governing signal, and means responsive to an electrical state on the series connection between the memory means for determining said governing signal.

* * * * *